(12) United States Patent
Komaki

(10) Patent No.: US 9,940,564 B2
(45) Date of Patent: Apr. 10, 2018

(54) WIRELESS IC DEVICE, CLIP-SHAPED RFID TAG, AND ARTICLE HAVING RFID TAG

(71) Applicant: Murata Manufacturing Co., Ltd., Nagaokakyo-shi, Kyoto-fu (JP)

(72) Inventor: Kunihiro Komaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1 day.

(21) Appl. No.: 15/278,165

(22) Filed: Sep. 28, 2016

(65) Prior Publication Data
US 2017/0017868 A1 Jan. 19, 2017

Related U.S. Application Data

(63) Continuation of application No. PCT/JP2015/062030, filed on Apr. 21, 2015.

(30) Foreign Application Priority Data

| Apr. 28, 2014 | (JP) | 2014-092643 |
| Jun. 20, 2014 | (JP) | 2014-126813 |
| Oct. 31, 2014 | (JP) | 2014-222167 |

(51) Int. Cl.
*H04Q 5/22* (2006.01)
*G06K 19/04* (2006.01)
(Continued)

(52) U.S. Cl.
CPC ........... *G06K 19/04* (2013.01); *G06K 19/077* (2013.01); *G06K 19/0779* (2013.01);
(Continued)

(58) Field of Classification Search
None
See application file for complete search history.

(56) References Cited

U.S. PATENT DOCUMENTS

| 6,933,898 B2 * | 8/2005 | Nantz | B60C 23/0416 |
| | | | 340/442 |
| 7,659,857 B2 * | 2/2010 | King | G06K 19/07749 |
| | | | 340/572.1 |

(Continued)

FOREIGN PATENT DOCUMENTS

| JP | 2004-192287 A | 7/2004 |
| JP | 2004-307209 A | 11/2004 |

(Continued)

OTHER PUBLICATIONS

Official Communication issued in corresponding International Application PCT/JP2015/062030, dated Jul. 7, 2015.

(Continued)

*Primary Examiner* — Curtis King
(74) *Attorney, Agent, or Firm* — Keating & Bennett, LLP

(57) ABSTRACT

In a wireless IC device, a columnar body includes a metal body with an insulating film. A loop-shaped antenna conductor is provided on an upper surface of the columnar body via an insulating pedestal. The loop surface of the antenna conductor is parallel or substantially parallel to the upper surface of the columnar body. On the lower surface of a RFIC element, two terminal electrodes are provided. The RFIC element is mounted on the antenna conductor such that the two terminal electrodes are connected to both ends of the antenna conductor, respectively. One end of the connecting conductor is connected to the vicinity of one end of the antenna conductor, and the other end of the connecting conductor is connected to the upper surface of the columnar body.

18 Claims, 14 Drawing Sheets

(51) Int. Cl.
*G06K 19/077* (2006.01)
*H01Q 7/00* (2006.01)
*H01Q 1/22* (2006.01)
*H01Q 9/42* (2006.01)
*H01Q 5/371* (2015.01)

(52) U.S. Cl.
CPC . *G06K 19/07758* (2013.01); *G06K 19/07771* (2013.01); *G06K 19/07786* (2013.01); *H01Q 1/2208* (2013.01); *H01Q 5/371* (2015.01); *H01Q 7/00* (2013.01); *H01Q 9/42* (2013.01)

(56) References Cited

U.S. PATENT DOCUMENTS

| | | | | |
|---|---|---|---|---|
| 8,058,998 | B2 * | 11/2011 | Burnside | H01Q 1/2216 340/10.1 |
| 8,169,322 | B1 * | 5/2012 | Zhan | G06K 19/07749 340/10.1 |
| 9,171,244 | B2 * | 10/2015 | Endou | H01Q 7/00 |
| 9,785,877 | B1 * | 10/2017 | Fink | G06K 19/0723 |
| 2005/0179529 | A1 * | 8/2005 | Sato | B60C 23/0433 340/445 |
| 2006/0196949 | A1 * | 9/2006 | Ando | G06K 19/07749 235/492 |
| 2007/0096891 | A1 * | 5/2007 | Sheriff | B60N 2/002 340/457.1 |
| 2007/0139285 | A1 | 6/2007 | Maruyama et al. | |
| 2007/0262871 | A1 * | 11/2007 | Yamagajo | G06K 19/07771 340/572.7 |
| 2008/0036608 | A1 * | 2/2008 | Sakama | G06K 19/07749 340/572.7 |
| 2008/0111760 | A1 * | 5/2008 | Sakama | G06K 19/07745 343/860 |
| 2009/0021352 | A1 | 1/2009 | Kataya et al. | |
| 2009/0021446 | A1 | 1/2009 | Kataya et al. | |
| 2009/0146821 | A1 | 6/2009 | Kato et al. | |
| 2010/0265041 | A1 * | 10/2010 | Almog | G06K 19/07749 340/10.1 |
| 2012/0006904 | A1 | 1/2012 | Kato et al. | |
| 2013/0221113 | A1 * | 8/2013 | Carr | H01Q 1/526 235/492 |
| 2015/0116090 | A1 * | 4/2015 | Proehl | H04B 5/0037 340/10.1 |

FOREIGN PATENT DOCUMENTS

| | | |
|---|---|---|
| JP | 2006-93977 A | 4/2006 |
| JP | 2009-15446 A | 1/2009 |
| JP | 2009-44715 A | 2/2009 |
| JP | 2010-218537 A | 9/2010 |
| WO | 2009/008296 A1 | 1/2009 |
| WO | 2010/119854 A1 | 10/2010 |

OTHER PUBLICATIONS

Official Communication issued in Japanese Patent Application No. 2016-145040, dated May 9, 2017.

* cited by examiner

WIRELESS IC DEVICE, CLIP-SHAPED RFID TAG, AND ARTICLE HAVING RFID TAG

CROSS REFERENCE TO RELATED APPLICATIONS

This application claims the benefit of priority to Japanese Patent Application No. 2014-092643 filed on Apr. 28, 2014, Japanese Patent Application No. 2014-126813 filed on Jun. 20, 2014 and Japanese Patent Application No. 2014-222167 filed on Oct. 31, 2014 and is a Continuation application of PCT Application No. PCT/JP2015/062030 filed on Apr. 21, 2015. The entire contents of each application are hereby incorporated herein by reference.

BACKGROUND OF THE INVENTION

1. Field of the Invention

The present invention relates to a wireless IC device and to a wireless IC device in which an RFIC (radio frequency integrated circuit) element is mounted on an object including a metal body. The present invention also relates to a clip-shaped RFID (radio frequency identifier) tag and to a clip-shaped RFID tag attachable to and detachable from a conductor of an article. The present invention further relates to an article including an RFID tag such as an article including a conductor and a clip-shaped RFID tag attachable to and detachable from the conductor.

2. Description of the Related Art

If an RFID tag utilizing the UHF band for wireless communications is directly affixed to a metal body, an electric field component of radio waves transmitted from a reader/writer becomes zero on a surface of the tag, making it unable to perform read/write of the tag. Therefore, when an RFID tag is affixed to a metal body, the RFID tag is generally located away from a metal surface.

In this regard, WO 2009/008296 discloses a technique of affixing an RFID tag having a loop antenna with a loop surface thereof perpendicular to a metal surface. This technique enables the RFID tag not only to pick up radio waves but also to utilize the metal surface as a radiation element, so that the RFID tag (wireless IC device) with a large gain is achieved.

According to JP 2004-192287 A, electronic data is stored in a clip clipping a medium to be clipped such as paper. The electronic data is output and input through wireless communications utilizing an RFID. According to JP 2004-307209 A, a notification assisting apparatus includes a first antenna part connected to a receiver, a second antenna part connected to an IC chip reader, and a clip-shaped main body to which these antenna parts are attached. When the notification assisting apparatus is attached to a file and the second antenna part is pivoted, the second antenna part projects downward from the notification assisting apparatus and comes into contact with, or in proximity to, a portion of the file. Transmission and reception between the notification assisting apparatus and an IC chip are smoothly performed through the second antenna part.

However, the structure of WO 2009/008296 including an RFID tag affixed with a loop surface perpendicular to a metal surface causes the RFID tag to project from the metal body and therefore is not suitable for a use particularly requiring robustness of a tag (e.g., for a gas cylinder).

By attaching an RFID tag to a clip as described in JP 2004-192287 A or JP 2004-307209 A the RFID tag can easily be attached to and detached from an object such as a paper document. However, if the object is a conductor, i.e., if the clip is attached to a conductor, the technique of JP 2004-192287 A or JP 2004-307209 A has a problem of not being able to ensure a sufficient communication distance because the conductor impairs the communication characteristics (particularly, the gain) of the RFID tag.

SUMMARY OF THE INVENTION

Therefore, preferred embodiments of the present invention provide wireless IC devices capable of enhancing the robustness and the gain.

Other preferred embodiments of the present invention provide clip-shaped RFID tags and articles including an RFID tag capable of enhancing the communication characteristics.

A wireless IC device according to a preferred embodiment of the present invention includes an object with a metal body; a loop conductor including a first loop end and a second loop end; an RFIC element including a first terminal electrode and a second terminal electrode respectively connected to the first loop end and the second loop end; and a connection conductor including a first end and a second end respectively connected to the loop conductor and the object, the first end is connected to the loop conductor in the vicinity of the first loop end.

Preferably, the loop conductor is disposed such that a loop surface of the lop conductor extends along a surface of the object.

Preferably, the RFIC element includes an RFIC chip including a first input/output terminal and a second input/output terminal respectively connected to the first terminal electrode and the second terminal electrode; an electrical length between the first input/output terminal and the second input/output terminal is about ½ of a wavelength of a communication signal; and an electrical length from a farthest end of the metal body based on the second end to the first input/output terminal is equal to or greater than about ½ of a wavelength of the communication signal.

In a certain aspect of a preferred embodiment of the present invention, the metal body includes a first edge that is different from a second edge corresponding to the farthest end, and the second end is connected at the first edge to the object.

In another aspect of a preferred embodiment of the present invention, the RFIC element further includes a power feeding circuit located between the loop conductor and the RFIC chip, and the first terminal electrode and the second terminal electrode are connected through the power feeding circuit to the first input/output terminal and the second input/output terminal.

Preferably, the wireless IC device further includes an insulator provided on the surface of the object, and the second end is connected through the insulator to the object.

A clip-shaped RFID tag according to a preferred embodiment of the present invention is a clip-shaped RFID tag attachable to and detachable from a conductor of an article, including a conductive clip attachable to the conductor; a loop conductor including a first loop end and a second loop end; an RFIC element including a first terminal electrode and a second terminal electrode respectively connected to the first loop end and the second loop end; and a connection conductor including a first end connected to the clip and a second end connected to the loop conductor in the vicinity of the first loop end.

Preferably, the first end of the connection conductor is connected to the clip at a position opposite to a point of action of the clip relative to a fulcrum of the clip.

Preferably, the RFIC element includes an RFIC chip including a first input/output terminal and a second input/output terminal respectively connected to the first terminal electrode and the second terminal electrode; an electrical length between the first input/output terminal and the second input/output terminal is about ½ of a wavelength of a communication signal; and an electrical length from a tip of the clip to the first input/output terminal is less than about ½ of a wavelength of the communication signal.

An article including an RFID tag according to a preferred embodiment of the present invention includes an article including a conductor; and a clip-shaped RFID tag attachable to and detachable from the conductor, the clip-shaped RFID tag including a conductive clip attached to the conductor, a loop conductor including a first loop end and a second loop end, an RFIC element including a first terminal electrode and a second terminal electrode respectively connected to the first loop end and the second loop end, and a connection conductor including a first end connected to the clip and a second end connected to the loop conductor in the vicinity of the first loop end.

A current flowing through the loop conductor is maximized in the vicinity of a loop end. Therefore, when the loop conductor and the object are connected, connecting the connection conductor in the vicinity of the loop end maximizes the current flowing through the metal body of the object and therefore improves the gain. By disposing the loop conductor on the object such that the loop surface is along the surface of the object, the robustness of the wireless IC device is improved.

A current amount (current density) flowing through the loop conductor is maximized in the vicinity of a loop end. Therefore, when the loop conductor and the clip is connected, connecting the connection conductor in the vicinity of the loop end maximizes the current amount flowing through the clip and therefore maximizes the current amount flowing through the conductor of the article to which the clip is attached. The conductor of the article defines and functions as a radiator or a radiation element, so that a high gain is produced. As a result, the communication characteristics are improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
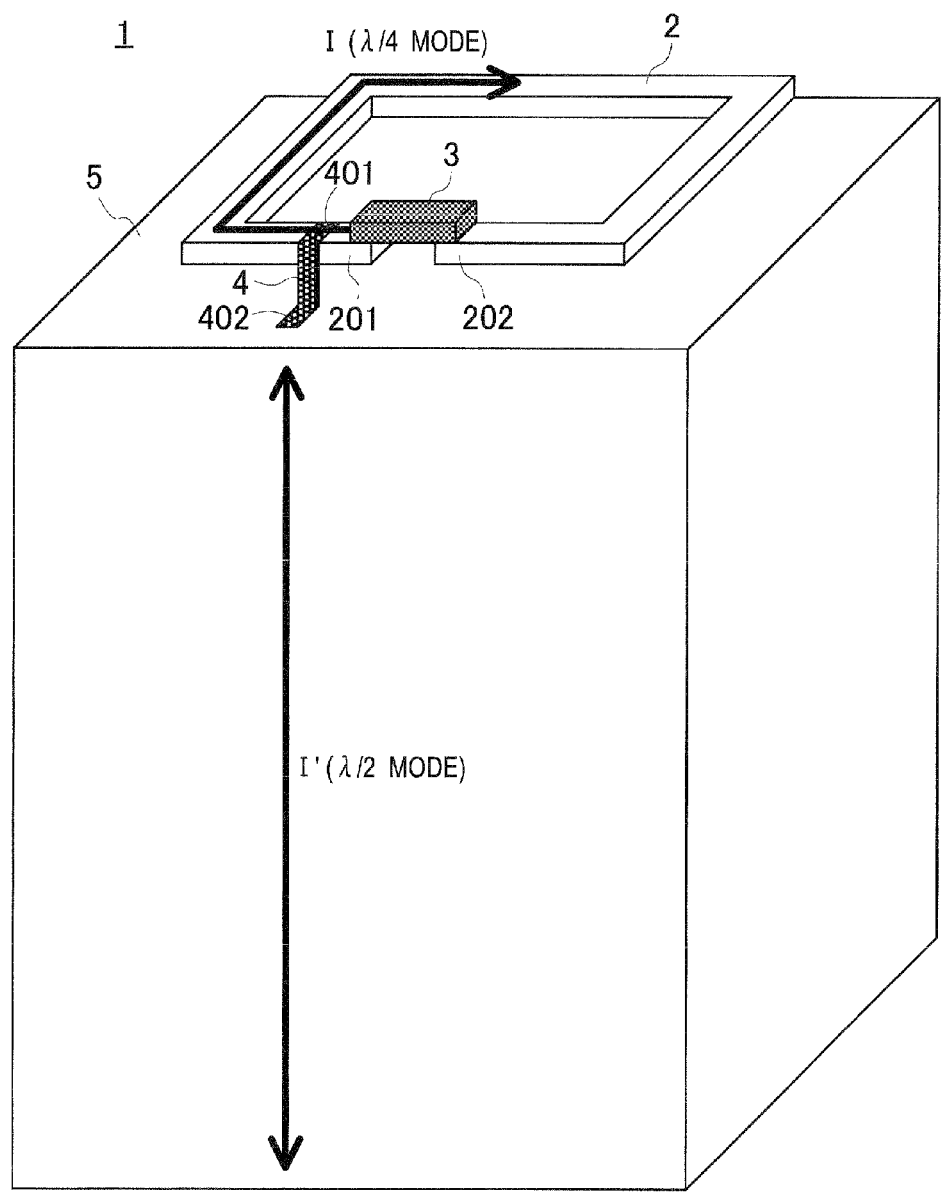
FIG. 1 is a perspective view of a basic configuration of a preferred embodiment of the present invention.

Referring to FIG. 1, a wireless IC device 1 according to a preferred embodiment of the present invention preferably is an RFID device using the UHF band as a communication frequency. The wireless IC device 1 includes a loop conductor 2, an RFIC element 3, a connection conductor 4, and a metal body 5. The metal body 5 preferably has a rectangular or substantially rectangular columnar shape. The loop conductor 2, the RFIC element 3, and the connection conductor 4 are disposed on an upper surface of the metal body 5.

Specifically, the loop conductor 2 is disposed in a posture with a loop surface thereof parallel or substantially parallel to the upper surface of the metal body 5 at a slight distance from the upper surface of the metal body 5. In other words, the loop conductor 2 is disposed in a posture with the loop surface extending along the upper surface of the metal body 5 without contacting with the metal body 5 above the metal body 5.

An RFIC chip (not shown) includes a first input/output terminal and a second input/output terminal, and the RFIC is embedded inside the RFIC element 3. A lower surface of the RFIC element 3 is provided with a first terminal electrode and a second terminal electrode (both not shown) respectively connected to the first input/output terminal and the second input/output terminal. The first terminal electrode is connected to one end (a first loop end) 201 of the loop conductor 2, and the second terminal electrode is connected to the other end (a second loop end) 202 of the loop conductor 2. One end (a first end) 401 of the connection conductor 4 is connected to the vicinity of the one end 201 of the loop conductor 2, and the other end (a second end) 402 of the connection conductor 4 is connected to a predetermined position (certain edge) on the upper surface of the metal body 5.

With regard to the "vicinity" described above, when a length (an electrical length) from the one end 201 to the other end 202 of the loop conductor 2 is A, the connection conductor 4 is preferably connected to the loop conductor 2 within a range of length from the one end 201 up to approximately A/4, more preferably within a range of length from the one end 201 up to approximately A/8, for example.

An electrical length between the first input/output terminal and the second input/output terminal disposed on the RFIC chip is adjusted to about $\lambda/2$. The height of the metal body 5 (distance from the upper surface to the lower surface) is adjusted to about $\lambda/2$ or more. Since the other end 402 of the connection conductor 4 is connected to the predetermined position on the upper surface of the metal body 5, an electrical length from a farthest end of the metal body 5 based on the predetermined position to the first input/output terminal is also about $\lambda/2$ or more.

When a radio-frequency signal is transmitted from the RFIC element 3, a current I flows through the loop conductor 2 in a $\lambda/4$ mode, and a current I' originated from the current I flows through the metal body 5 in a $\lambda/2$ mode. Therefore, the loop conductor 2 defines and functions as an exciter or an exciting loop, and the metal body 5 defines and functions as a radiator.

The one end 401 of the connection conductor 4 is connected to a point at which the current I flowing through the loop conductor 2 is maximized. As a result, the current I' flowing through the metal body 5 is also maximized and, therefore, the radio-frequency transmission performance is improved (the gain for the wireless IC device is significantly improved). The loop surface of the loop conductor 2 is parallel or substantially parallel to the upper surface of the metal body 5. Therefore, the loop conductor 2 does not significantly project from the upper surface of the metal body 5 and the wireless IC device 1 is able to be enhanced in robustness.

First Preferred Embodiment

Figure 2:
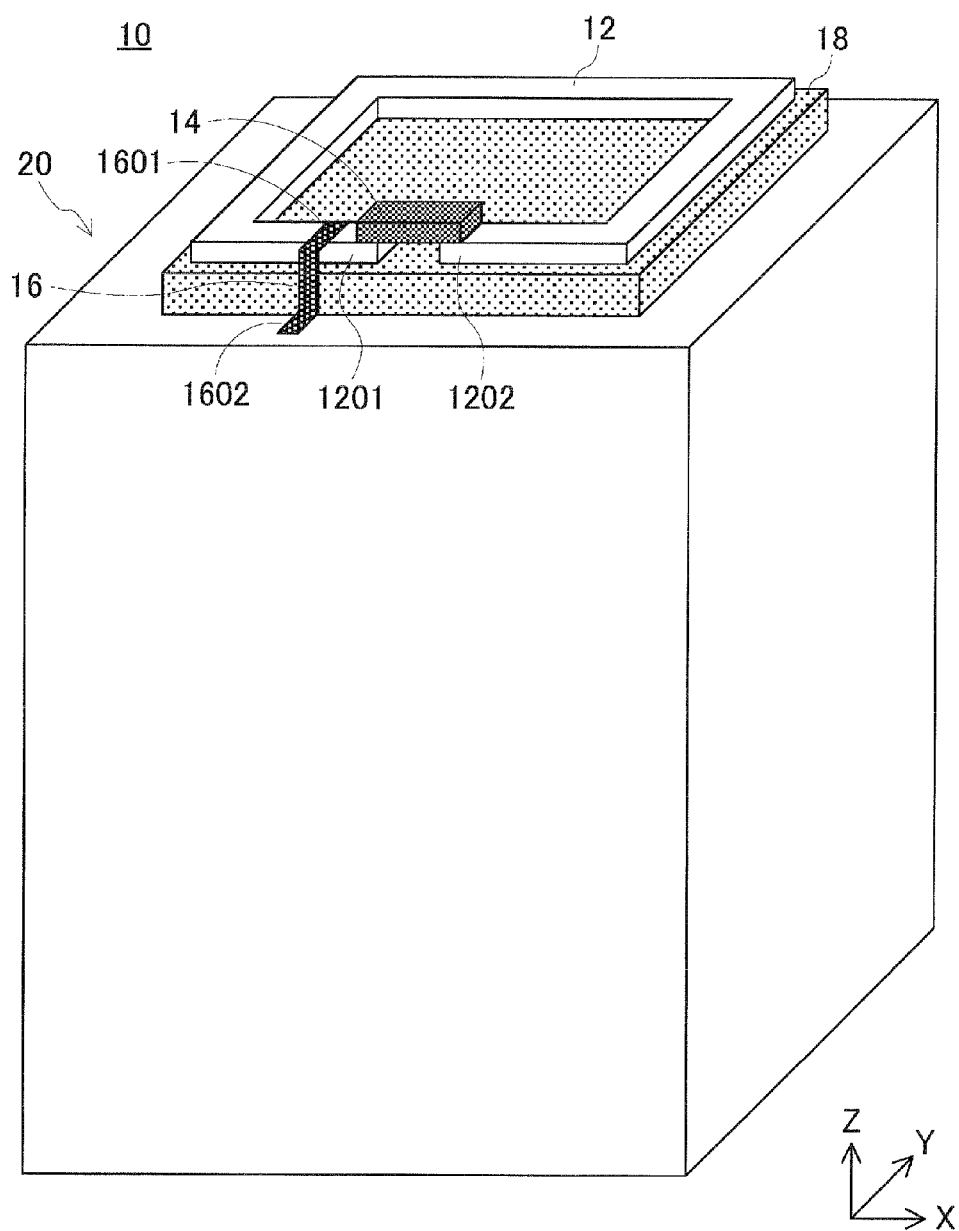
FIG. 2 is a perspective view of an example of a wireless IC device of a first preferred embodiment of the present invention viewed obliquely from above.
Figure 3:
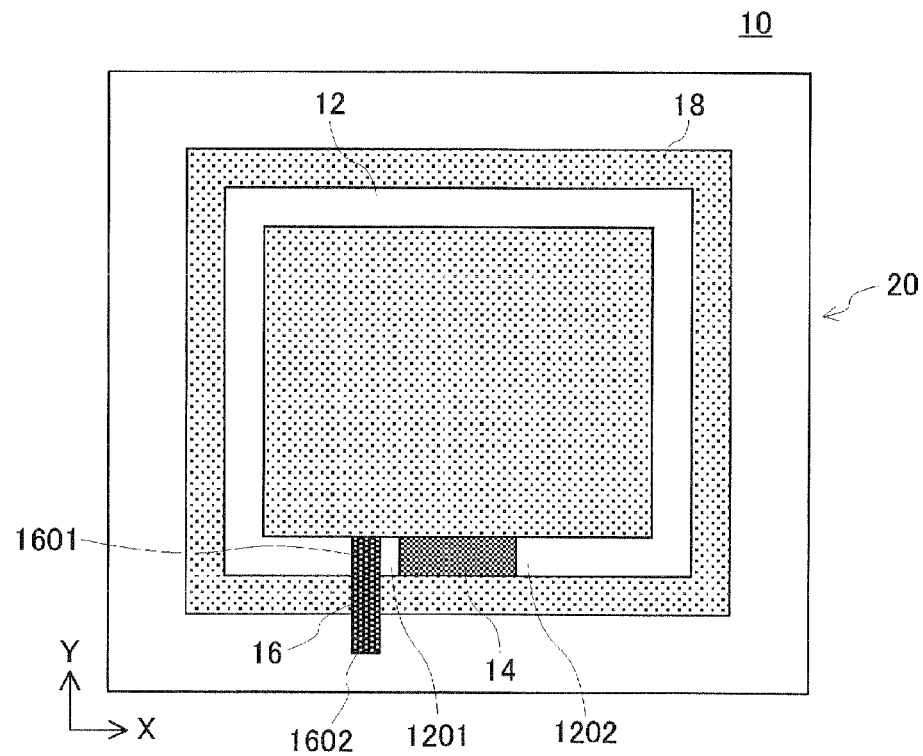
FIG. 3 is a top view of the wireless IC device of the first preferred embodiment of the present invention viewed from directly above.

Referring to FIGS. 2 and 3, a wireless IC device 10 of a first preferred embodiment of the present invention includes a loop-shaped antenna conductor 12, a rectangular or substantially rectangular parallelepiped RFIC element 14, a belt-shaped connection conductor 16, an insulating pedestal (spacer) 18 defining a flat plate, and a rectangular or substantially rectangular columnar body 20. In the first preferred embodiment, an X-axis, a Y-axis, and a Z-axis are assigned to a width direction, a depth direction, and a height direction, respectively, of the columnar body 20.

The pedestal 18 includes a principal surface smaller than an upper surface of the columnar body 20 and is placed in a posture with the principal surface perpendicular or substantially perpendicular to the Z-axis on the center of the upper surface of the columnar body 20. The antenna conductor 12 has a loop surface smaller than the principal surface of the pedestal 18 and is placed in a posture with the loop surface perpendicular or substantially perpendicular to the Z-axis on the center of one principal surface (an upper surface) of the pedestal 18. Therefore, the antenna conductor 12 is disposed in a posture with the loop surface parallel or substantially parallel to the upper surface of the columnar body 20 (in a posture with the loop surface extending along the upper surface of the columnar body 20) at a position away from the columnar body 20. The RFIC element 14 is smaller than the antenna conductor 12 and is mounted on the antenna conductor 12 to straddle one end (a first loop end) 1201 and the other end (a second loop end) 1202 of the antenna conductor 12.

Figure 5:
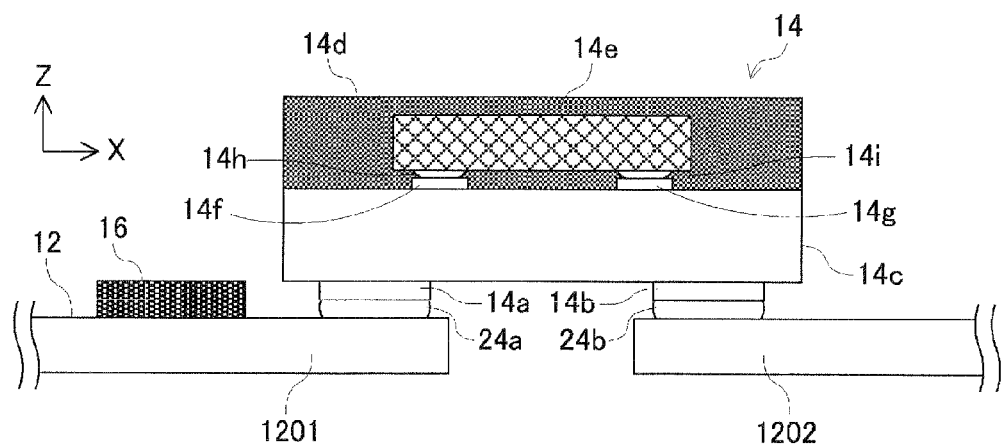
FIG. 5 is a schematic of an example of a structure of an RFIC element applied to the wireless IC device of the first preferred embodiment of the present invention.

As can be seen from FIG. 5, the RFIC element 14 includes an RFIC chip 14e processing an RFID signal and a power feeding circuit board 14c on which the RFIC chip 14e is mounted. The power feeding circuit board 14c is made of ceramic or resin and has a plate shape. The RFIC chip 14e includes a memory circuit and a signal processing circuit built-in and is sealed by a resin sealing layer 14d. The side surfaces of the power feeding circuit board 14c are perpendicular or substantially perpendicular to either the X-axis or Y-axis, and the side surfaces of the sealing layer 14d are flush with the side surfaces of the power feeding circuit board 14c.

A lower surface of the RFIC element 14 is provided with terminal electrodes 14a and 14b (14a: a first terminal electrode, 14b: a second terminal electrode) arranged along the X-axis. The terminal electrode 14a is connected or bonded via a conductive bonding material 24a (made of solder etc.) to the one end 1201 of the antenna conductor 12, and the terminal electrode 14b is connected or bonded via a conductive bonding material 24b (made of solder etc.) to the other end 1202 of the antenna conductor 12.

Input/output terminals 14f and 14g are provided on an upper surface of the power feeding circuit board 14c. Input/output terminals 14h and 14i (14h: a first input/output terminal, 14i: a second input/output terminal) are provided on a lower surface of the RFIC chip 14e. The input/output terminals 14f and 14g are connected or bonded by conductive bonding materials not shown (made of Ag etc.) to the input/output terminals 14h and 14i, respectively. The input/output terminals 14h and 14i are connected via a power feeding circuit 14fct (see FIG. 6) disposed on the power feeding circuit board 14c to the terminal electrodes 14a and 14b, respectively.

Figure 4:
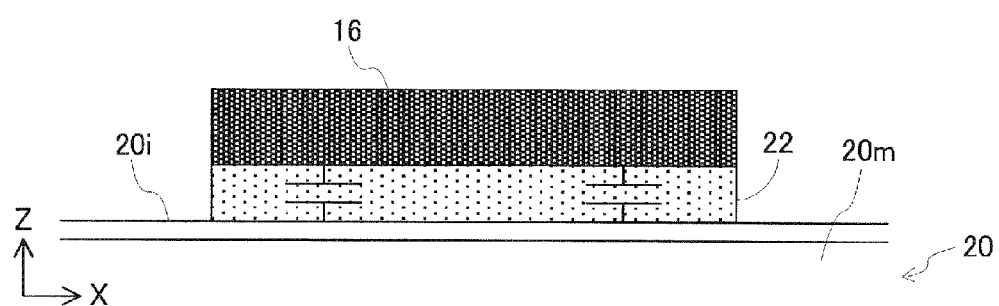
FIG. 4 is a schematic of a connected state between an end of a connection conductor and a columnar body.

One end (a first end) 1601 of the connection conductor 16 is connected to the vicinity of the one end 1201 of the antenna conductor 12, and the other end (a second end) 1602 of the connection conductor 16 is connected to a predetermined position (certain edge) on the upper surface of the columnar body 20. Referring to FIG. 4, the columnar body 20 preferably includes a solid or hollow metal body 20m and an insulation film 20i covering the surface of the metal body 20m. The one end 1601 of the connection conductor 16 is connected via a conductive bonding material such as solder to the antenna conductor 12, and the other end 1602 of the connection conductor 16 is bonded via an insulating bonding material 22 to the upper surface of the columnar body 20.

With regard to the "vicinity" described above, when a length (an electrical length) from the one end 1201 to the other end 1202 of the antenna conductor 12 is A, the connection conductor 16 is preferably connected to the antenna conductor 12 within a range of length from the one end 1201 up to approximately A/4, more preferably within a range of length from the one end 1201 up to approximately A/8, for example.

Figure 6:
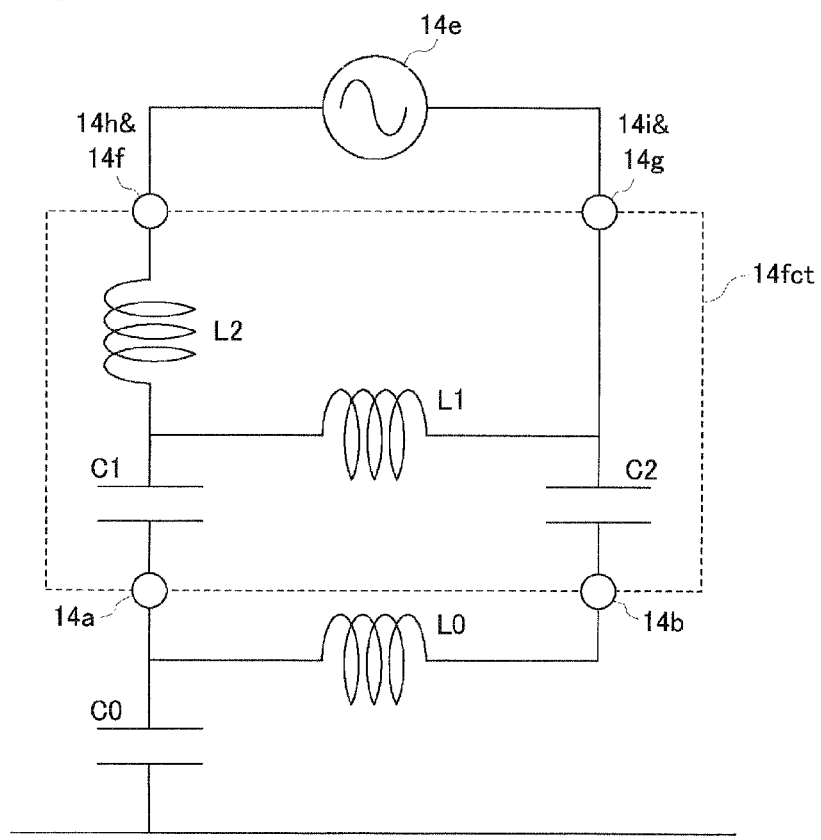
FIG. 6 is a circuit diagram of an equivalent circuit of the wireless IC device of the first preferred embodiment of the present invention.

FIG. 6 shows an equivalent circuit of the wireless IC device 10. The power feeding circuit 14fct is disposed on the power feeding circuit board 14c. One end of a capacitor C1 is connected to the terminal electrode 14a, and the other end of the capacitor C1 is connected to one end of an inductor L2. The other end of the inductor L2 is connected to the input/output terminal 14f, and therefore, to the input/output terminal 14h. One end of a capacitor C2 is connected to the terminal electrode 14b, and the other end of the capacitor C1 is connected to the input/output terminal 14g, and therefore, to the input/output terminal 14i. One end of an inductor L1 is connected to the other end of the capacitor C1, and the other end of the inductor L1 is connected to the other end of the capacitor C2.

An inductor L0 is an inductor component of the antenna conductor 12 and is magnetically coupled to the inductors L1 and L2. A capacitor component based on the insulating bonding material 22 and the insulation film 20i is present between the other end 1602 of the connection conductor 16 and the metal body 20m. A capacitor C0 is this capacitor component. The inductor L0 and the capacitor C0 enable matching in a broadband.

An electrical length between the two input/output terminals 14h and 14i disposed on the RFIC chip 14e is adjusted to about $\lambda/2$. The height of the metal body 20m (distance from the upper surface to the lower surface) is adjusted to about $\lambda/2$ or more. Since the other end 1602 of the connection conductor 16 is connected to the predetermined position on the upper surface of the columnar body 20, an electrical length from a farthest end of the metal body 20m based on the predetermined position to the input/output terminal 14h is also about $\lambda/2$ or more.

When a radio-frequency signal is transmitted from the RFIC element 14, the current I' originated from the current I flowing through the antenna conductor 12 flows through the columnar body 20. In this case, a maximum current point is formed at a position in the vicinity of the both ends 1201, 1202 of the antenna conductor 12, and a maximum voltage point is formed at a position in the vicinity of the center of the antenna conductor 12 (a position farthest from the RFIC element 14). Therefore, the antenna conductor 12 defines and functions as a first radiation element (an exciter or an exciting loop).

Since the other end 1602 of the connection conductor 16 is connected to the predetermined position on the upper surface of the columnar body 20 when the antenna conductor 12 and the columnar body 20 are connected, the current I' tends to flow through the side surfaces of the metal body 20m, and the columnar body 20 defines and functions as a second radiation element.

Additionally, since the one end 1601 of the connection conductor 16 is connected to the maximum current point of the antenna conductor 12, the current I' flowing through the columnar body 20 is also maximized. As a result, the radio-frequency transmission performance is improved (the gain for the wireless IC device is significantly improved).

Since the loop surface of the antenna conductor 12 is parallel or substantially parallel to the upper surface of the columnar body 20, the antenna conductor 12 does not significantly project from the upper surface of the columnar body 20. As a result, the wireless IC device 10 is able to be enhanced in robustness.

Figure 7:
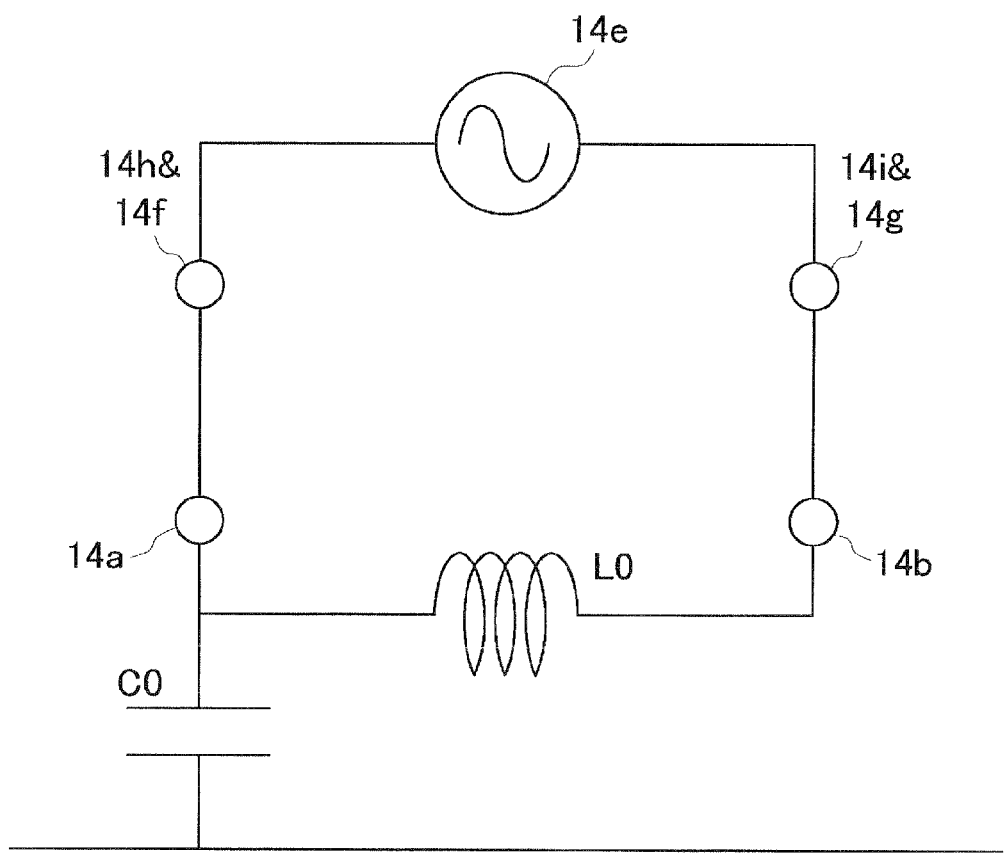
FIG. 7 is a circuit diagram of an equivalent circuit of the wireless IC device of a modification example of the first preferred embodiment of the present invention.

Although the power feeding circuit 14fct shown in FIG. 6 is disposed on the power feeding circuit board 14c in the first preferred embodiment, the power feeding circuit 14fct may not be included. In this case, the equivalent circuit is configured as shown in FIG. 7.

In the first preferred embodiment, the other end 1602 of the connection conductor 16 is bonded via the insulating bonding material 22 to the upper surface of the columnar body 20. However, the other end 1602 of the connection conductor 16 may directly be connected to the metal body 20m.

In the first preferred embodiment, the RFIC element 14 has the structure in which the RFIC chip 14e is sealed by the sealing layer 14d so as to enhance the robustness. However, an RFIC bare chip may be configured as the RFIC element 14.

Second Preferred Embodiment

Figure 8:
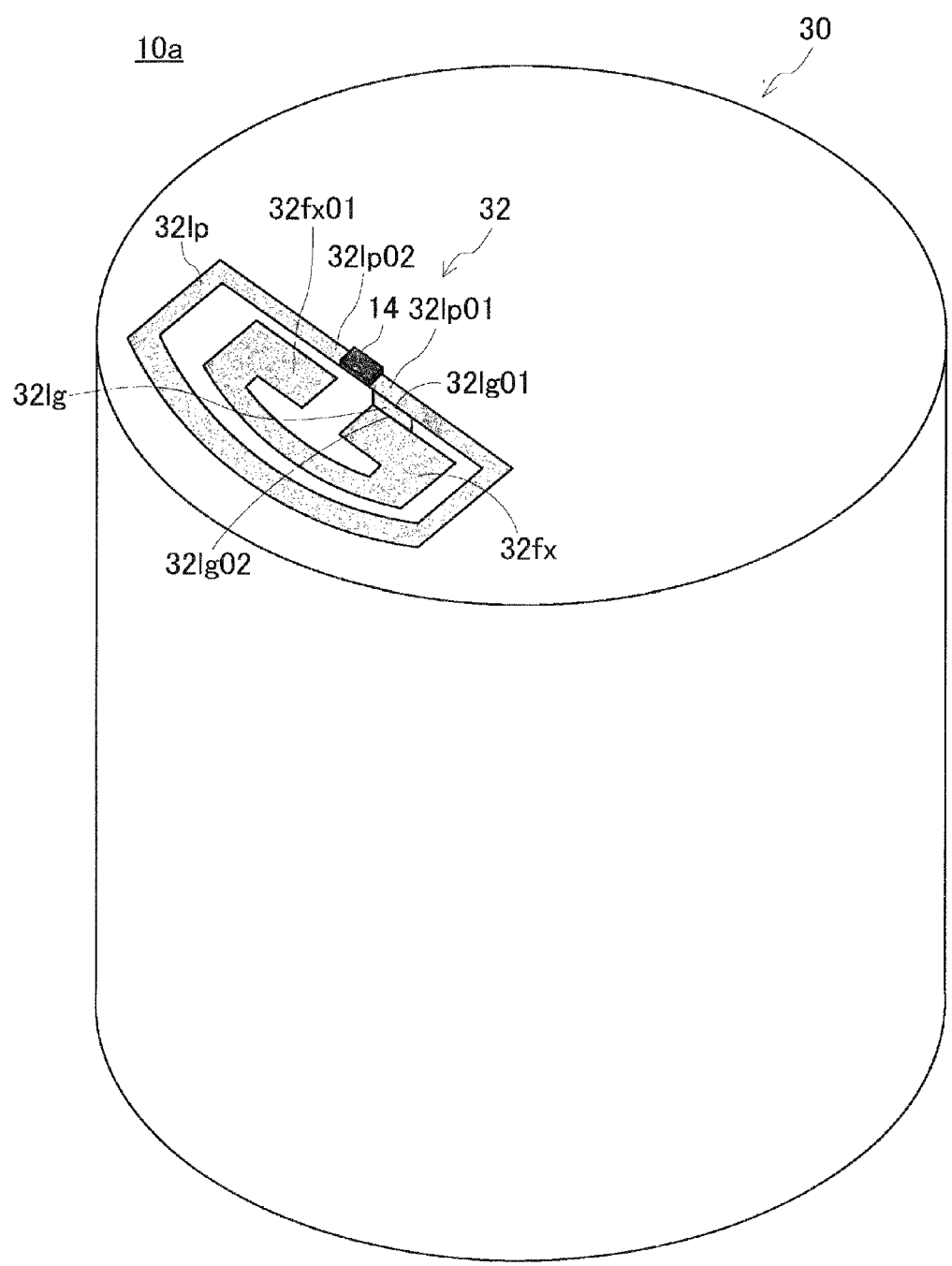
FIG. 8 is a perspective view of an example of a wireless IC device of a second preferred embodiment of the present invention viewed obliquely from above.
Figure 9:
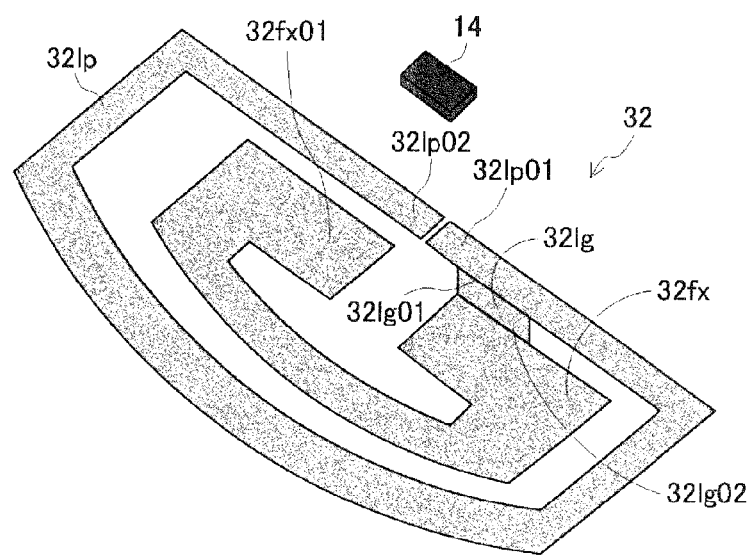
FIG. 9 is an exploded perspective view of an antenna conductor and an RFIC element mounted thereon.

Referring to FIGS. 8 and 9, a wireless IC device 10a of a second preferred embodiment of the present invention preferably includes an antenna conductor 32, the RFIC element 14, and a circular columnar body 30.

The antenna conductor 32 is a conductor including a loop portion (loop conductor) 321p, a leg portion (portion of a connection conductor) 321g, and a fixing portion (another portion of the connection conductor) 32fx integrally formed. As described later in detail, the antenna conductor 32 is produced preferably by punching and bending of a hoop material. As a result, a principal surface of the loop portion 321p and a principal surface of the fixing portion 32fx spread in parallel or substantially in parallel with each other, and a principal surface of the leg portion 321g extends perpendicularly or substantially perpendicularly to the principal surface of the loop portion 321p or the fixing portion 32fx.

The loop portion 321p includes one end (a first loop end) 321p01 and the other end (a second loop end) 321p02 and defines a loop considerably smaller than an upper surface (=a cross section perpendicular or substantially perpendicular to the axis of the column) of the columnar body 30. In this case, a loop surface extends parallel or substantially parallel with the principal surface of the loop portion 321p.

The one end 321g01 of the leg portion 321g defines a first end of the connection conductor and is connected to the vicinity of the one end 321p01 of the loop portion 321p. The other end 321g02 of the leg portion 321g is connected to the fixing portion 32fx. The fixing portion 32fx also defines a loop, and the other end 321g02 of the leg portion 321g is connected to one end of this loop. The other end (a second end of the connection conductor) 32fx01 of the loop drawn by the fixing portion 32fx is connected to a predetermined position (certain edge) on the upper surface of the columnar body 30.

With regard to the "vicinity" described above, when a length (an electrical length) from the one end 321p01 to the other end 321p02 of the loop portion 321p is A, the leg portion 321g is preferably connected to the loop portion 321p within a range of length from the one end 321p01 up to approximately A/4, more preferably within a range of length from the one end 321p01 up to approximately A/8, for example.

While the antenna conductor 32 is mounted on the upper surface of the columnar body 30 in this way, the principal surface of the fixing portion 32fx extends parallel or substantially parallel with the upper surface of the columnar body 30. The principal surface of the loop portion 321p extends parallel or substantially parallel with the principal surface of the fixing portion 32fx, and the loop portion 321p is connected via the leg portion 321g to the fixing portion 32fx. Therefore, the loop portion 321p is disposed in a posture with the loop surface parallel to the upper surface of the columnar body 30 (in a posture with the loop surface extending along the upper surface of the columnar body 30) at a position at a predetermined interval from the columnar body 30.

The RFIC element 14 has the structure shown in FIG. 5 and is smaller than the loop portion 321p and mounted on the loop portion 321p to straddle the one end 321p01 and the other end 321p02 of the loop portion 321p. The terminal electrodes 14a and 14b disposed on the RFIC element 14 are respectively connected or bonded via conductive bonding materials (not shown) such as solder to the one end 321p01 and the other end 321p02 of the loop portion 321p.

Figure 10:
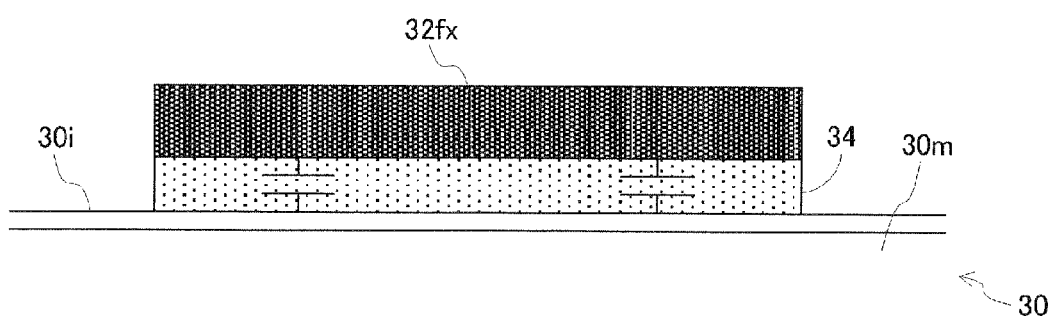
FIG. 10 is a schematic of a connected state between the antenna conductor and a columnar body.

Referring to FIG. 10, the columnar body 30 includes a solid or hollow metal body 30m and an insulation film 30i covering the surface of the metal body 30m. The fixing portion 32fx is bonded via an insulating bonding material 34 to the upper surface of the columnar body 30.

An electrical length between the two input/output terminals 14h and 14i disposed on the RFIC chip 14e is adjusted to about λ/2. The height of the metal body 30m (distance from the upper surface to the lower surface) is adjusted to about λ/2 or more. Since the loop portion 321p is connected via the leg portion 321g and the fixing portion 32fx to the upper surface of the columnar body 30, an electrical length from a farthest end of the metal body 30m based on the predetermined position of connection of the fixing portion 32fx to the input/output terminal 14h is also about λ/2 or more.

When a radio-frequency signal is transmitted from the RFIC element 14, the current I' originated from the current I flowing through the loop portion 321p flows through the columnar body 30. In this case, a maximum current point is formed at a position in the vicinity of the both ends 321p01, 321p02 of the loop portion 321p, and a maximum voltage point is formed at a position in the vicinity of the center of the loop portion 321p (a position farthest from the RFIC element 14). Therefore, the loop portion 321p defines and functions as the first radiation element (an exciter or an exciting loop).

Since the other end 32fx02 of the fixing portion 32fx connected via the leg portion 321g to the loop portion 321p is connected to the predetermined position on the upper surface of the columnar body 30, the current I' tends to flow through the side surfaces of the metal body 30m, and the columnar body 30 defines and functions as the second radiation element.

Additionally, since the one end 321g01 of the leg portion 321g is connected to the maximum current point of the loop portion 321p, the current I' flowing through the columnar body 30 is also maximized. As a result, the radio-frequency transmission performance is improved (the gain for the wireless IC device is significantly improved).

Since the loop surface of the loop portion 321p is parallel or substantially parallel to the upper surface of the columnar body 30, the loop portion 321p does not significantly project from the upper surface of the columnar body 30. As a result, the wireless IC device 10a is able to be enhanced in robustness.

A non-limiting example of a method of manufacturing the antenna conductor 32 and a method of mounting the RFIC element 14 will be described with reference to FIGS. 11A to 11D.

Figure 11A:
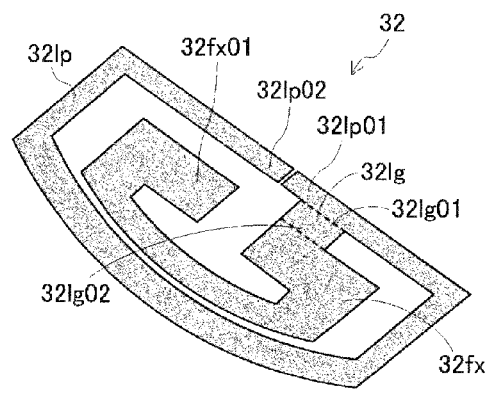
FIG. 11A is a schematic view of a portion of a process of producing the antenna conductor.
Figure 11B:
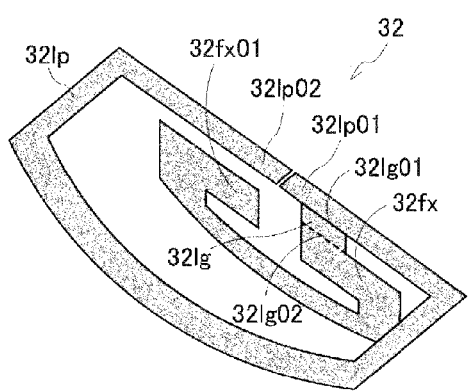
FIG. 11B is a schematic view of another portion of the process of producing the antenna conductor.
Figure 11C:
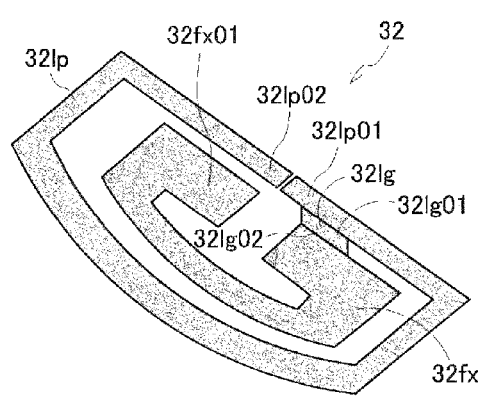
FIG. 11C is a schematic view of yet another portion of the process of producing the antenna conductor.
Figure 11D:
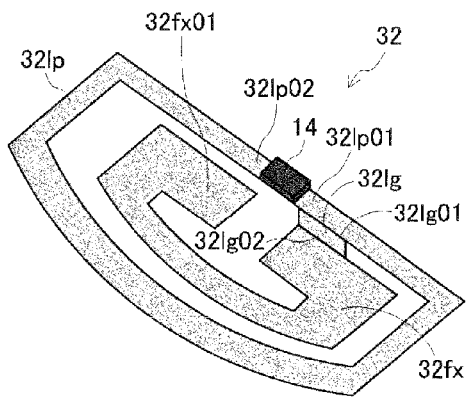
FIG. 11D is a schematic view of a further portion of the process of mounting an RFIC chip on the antenna conductor.
Figure 12A:
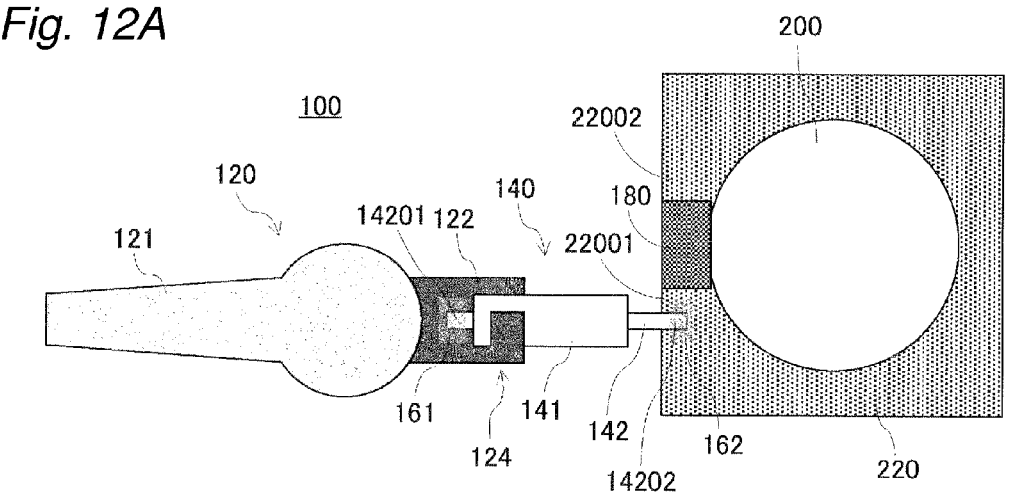
FIG. 12A is a top view of a clip-shaped RFID tag of a third preferred embodiment of the present invention viewed from directly above and FIG. 12B is a side view of the clip-shaped RFID tag of the third preferred embodiment of the present invention from the side.
Figure 12B:
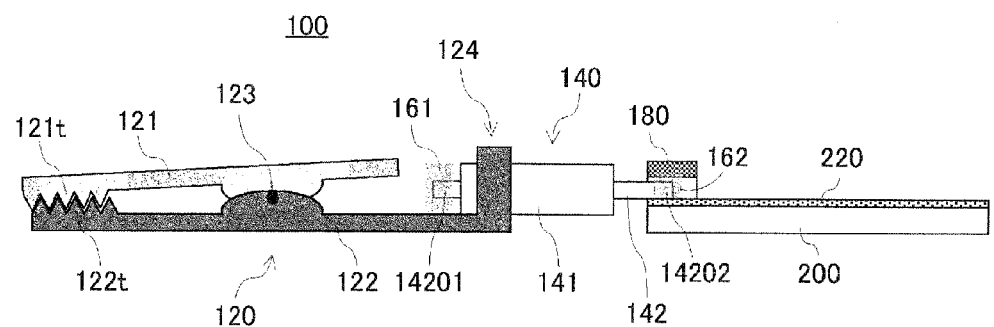
Figure 13:
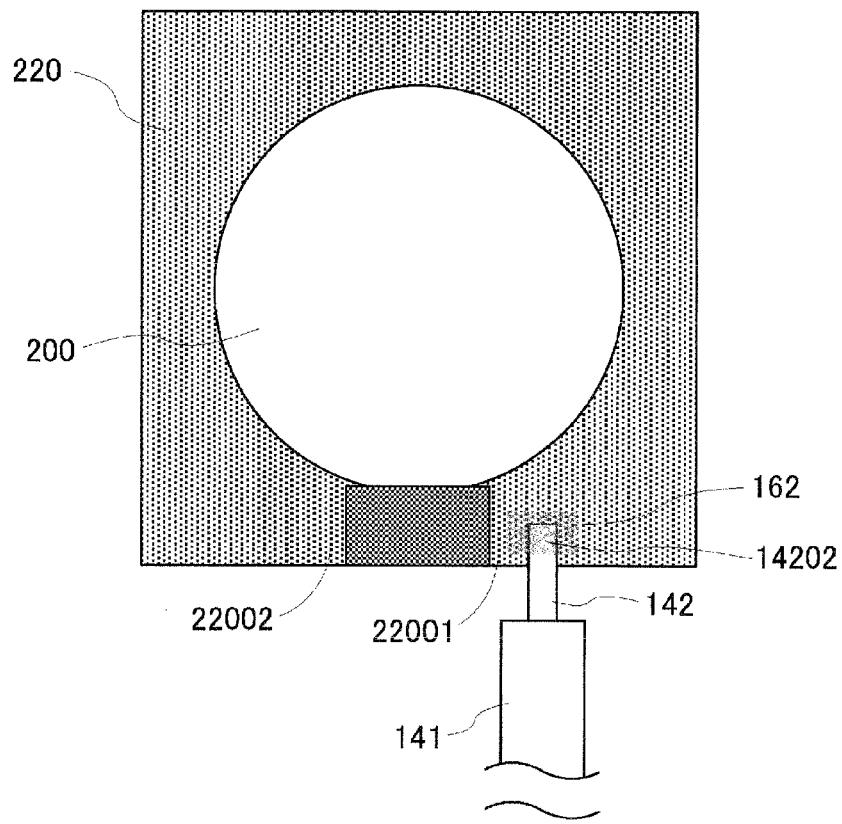
FIG. 13 is a schematic of a connected state between a loop conductor and a connection conductor applied to the clip-shaped RFID tag of the third preferred embodiment of the present invention.
Figure 14:
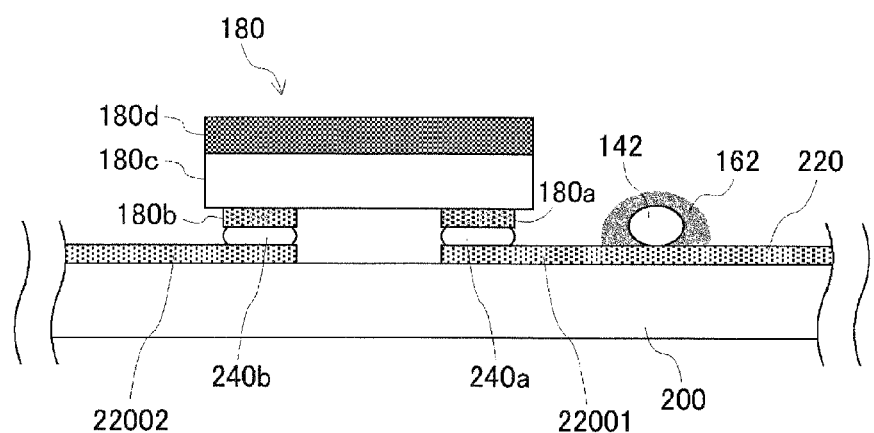
FIG. 14 is a schematic of a connected state between an RFIC element and the loop conductor applied to the clip-shaped RFID tag of the third preferred embodiment of the present invention.

First, a plate-shaped conductor including the loop portion 321p, the leg portion 321g, and the fixing portion 32fx is punched out from a hoop material (see FIG. 11A). The leg portion 321g and the fixing portion 32fx are then bent 90° downward at a connection portion between the loop portion 321p and the leg portion 321g (see FIG. 11B). Subsequently, the fixing portion 32fx is bent 90° upward at a connection portion between the leg portion 321g and the fixing portion 32fx (see FIG. 11C). After the antenna conductor 32 is completed in this way, the RFIC element 14 is mounted to straddle the one end 321p01 and the other end 321p02 of the loop portion 321p (see FIG. 11D).

As described above, the loop portion 321p, the leg portion 321g, and the fixing portion 32fx of the antenna conductor 32 are preferably integrally formed by punching and bending of the hoop material. Therefore, the antenna conductor 32 is easily produced.

Third Preferred Embodiment

Referring to FIGS. 12A, 12B, 13, and 14, a clip-shaped RFID tag 100 of a third preferred embodiment of the present invention preferably is an RFID tag using the 900 MHz band as a communication frequency and includes a crocodile clip 120, a lead wire 140, an RFIC element 180, and a loop conductor 220.

The crocodile clip 120 includes conductive clip pieces 121 and 122. A serrated locking portion 121t is provided on an inside surface of a tip of the clip piece 121, and a serrated locking portion 122t is provided on an inside surface of a tip of the clip piece 122. The length of the clip piece 122 exceeds the length of the clip piece 121, and a retainer 124 (described later in detail) retaining the lead wire 140 is provided at a base end of the clip piece 122.

The clip pieces 121 and 122 are supported by a conductive shaft (supporting member) 123 such that the locking portions 121t and 122t engage with each other, and are made swingable in the rotation direction of the shaft 123. A torsion coil spring not shown is disposed around the shaft 123, and the locking portion 121t of the clip piece 121 is pressed against the locking portion 122t of the clip piece 122 by the restoring force of the torsion coil spring.

The crocodile clip 120 having such a structure allows the shaft 123 to define and function as a fulcrum, the tips of the clip pieces 121 and 122 to define and function as points of action, and the base ends of the clip pieces 121 and 122 to define and function as points of force. The locking portion 121t of the clip piece 121 is separated from the locking portion 122t of the clip piece 122 by applying to the points of effort an external force exceeding the restoring force of the torsion coil spring in the opposite direction.

The loop conductor 220 is a loop-shaped antenna conductor including a first loop end 2201 and a second loop end 2202 and is supported by an insulating base plate 200. The base plate 200 has a principal surface defining a rectangle, and the size of this rectangle is identical to the rectangle circumscribing the loop conductor 220 in a planar view.

The lead wire 140 includes a wire connection conductor (core wire) 142 and a resin 141 covering the connection conductor 142 except a first end 14201 and a second end 14202. A certain position of the lead wire 140 (a position closer to the first end 14201 as compared to the center of the resin 141 in the length direction) is engaged with the retainer 124 disposed at the base end of the clip piece 122. As a result, the lead wire 140 is retained by the crocodile clip 120.

The first end 14201 of the connection conductor 142 is connected to the clip piece 122 by a conductive bonding material 161 (made of solder etc.; the same shall apply hereinafter). The second end 14202 of the connection conductor 142 is connected to the loop conductor 220 by a conductive bonding material 162. More specifically, the first end 14201 of the connection conductor 142 is connected to the clip piece 122 at a position close to the retainer 124, i.e., a position opposite to the point of action of the crocodile clip 120 relative to the fulcrum of the crocodile clip 120. The second end 14202 of the connection conductor 142 is connected to the vicinity of the first loop end 22001 of the loop conductor 220.

With regard to the "vicinity," when a length (an electrical length) from the first loop end 22001 to the second loop end 22002 of the loop conductor 220 is A, the connection conductor 142 is preferably connected to the loop conductor 220 within a range of length from the first loop end 22001 up to approximately A/4, more preferably within a range of length from the first loop end 22001 up to approximately A/8, for example.

Connecting the first end 14201 of the connection conductor 142 to the position described above reduces the risk of the connection conductor 142 preventing the attachment/detachment of the clip 120 and extends the electrical length from the tip of the clip piece 122 to the second end 14202 of the connection conductor 142 (described later in detail).

The RFIC element 180 is mounted on the loop conductor 220 to straddle the first loop end 22001 and the second loop end 22002. Specifically, the RFIC element 180 includes a first terminal electrode 180a and a second terminal electrode 180b, and the first terminal electrode 180a is connected by a conductive bonding material 240a to the first loop end 22001 while the second terminal electrode 180b is connected by a conductive bonding material 240b to the second loop end 22002.

Figure 15:
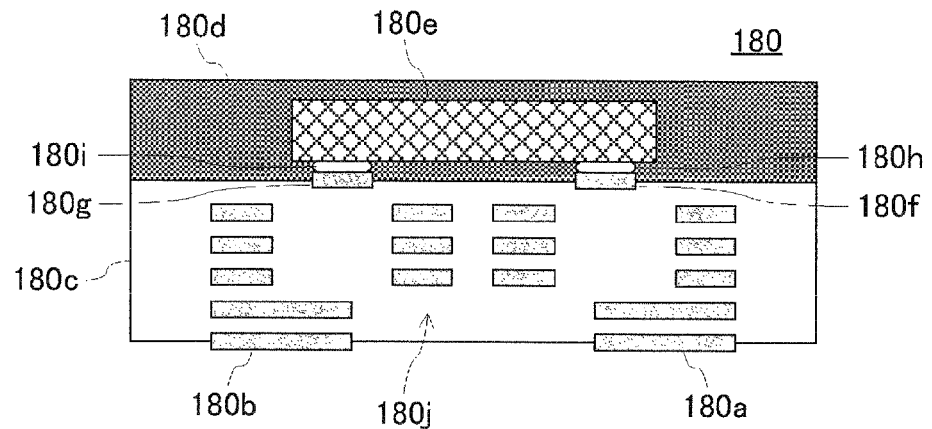
FIG. 15 is a cross-sectional view of a structure of the RFIC element applied to the clip-shaped RFID tag of the third preferred embodiment of the present invention.

As can be seen from FIG. 15, the RFIC element 180 preferably includes an RFIC chip 180e processing an RFID signal and a power feeding circuit board 180c on which the RFIC chip 180e is mounted. The power feeding circuit board 180c is made of ceramic or resin and preferably has a plate shape. The RFIC chip 180e includes a memory circuit and a signal processing circuit built-in and is sealed by a resin sealing layer 180d.

Input/output terminals 180f and 180g are provided on an upper surface of the power feeding circuit board 180c. Input/output terminals 180h and 180i (180h: a first input/output terminal, 180i: a second input/output terminal) are provided on a lower surface of the RFIC chip 180e. The input/output terminals 180f and 180g are connected by conductive bonding materials not shown (made of Ag etc.) to the input/output terminals 180h and 180i, respectively. The input/output terminals 180f and 180g are connected via a power feeding circuit 180j (see FIG. 16) disposed on the power feeding circuit board 180c to the first terminal electrode 180a and the second terminal electrode 180b, respectively.

Figure 16:
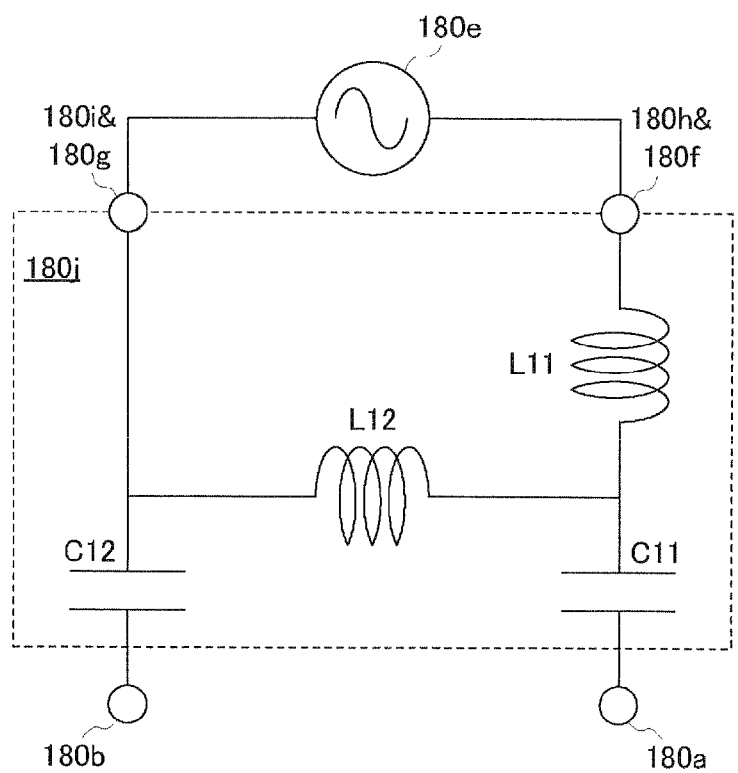
FIG. 16 is a circuit diagram of an equivalent circuit of the RFIC element applied to the clip-shaped RFID tag of the third preferred embodiment of the present invention.

FIG. 16 shows an equivalent circuit of the RFIC element 180. In the power feeding circuit 180j, one end of a capacitor C11 is connected to the first terminal electrode 180a, and the other end of the capacitor C11 is connected to one end of an inductor L11. The other end of the inductor L11 is connected to the input/output terminal 180f, and therefore, to the input/output terminal 180h. One end of a capacitor C12 is connected to the second terminal electrode 180b, and the other end of the capacitor C12 is connected to the input/output terminal 180g, and therefore, to the input/output terminal 180i. One end of an inductor L12 is connected to the other end of the capacitor C11, and the other end of the inductor L12 is connected to the other end of the capacitor C12. The inductors L11 to L12 and the capacitors C11 to C12 enable matching in a broadband.

An electrical length between the input/output terminals 180h and 180i disposed on the RFIC chip 180e is adjusted to about $\lambda/2$ ($=\frac{1}{2}$ wavelength of a communication signal). In contrast, an electrical length from the input/output terminal 180h to the tip of the clip piece 122 is adjusted to a value less than about $\lambda/2$ (preferably, a value set as close as possible to about $\lambda/2$ without causing resonance).

Figure 17A:
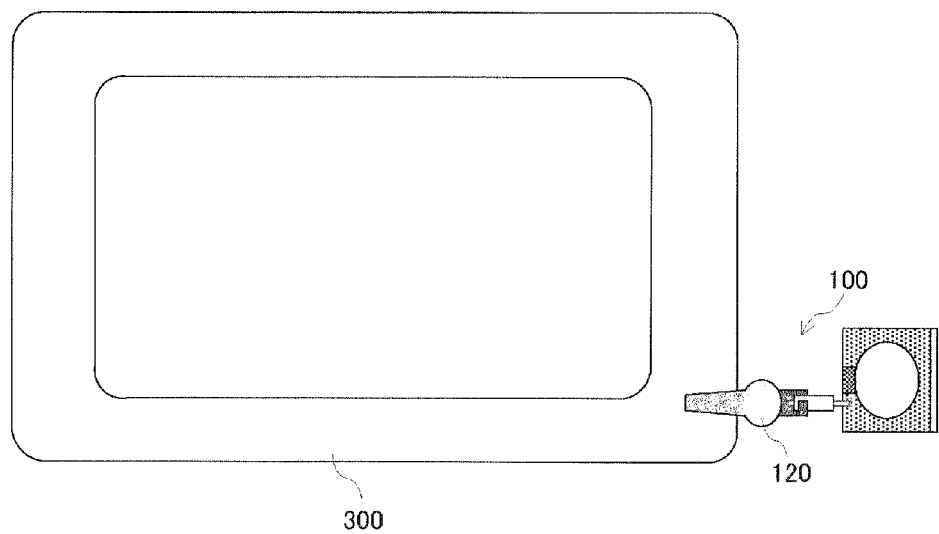
FIG. 17A is a top view of the clip-shaped RFID tag of the third preferred embodiment of the present invention and a tray to which the clip-shaped RFID tag is attached viewed from directly above and FIG. 17B is a side view of the clip-shaped RFID tag of the third preferred embodiment of the present invention and the tray to which the clip-shaped RFID tag is attached viewed from the side.
Figure 17B:

The clip-shaped RFID tag 100 is attached to a conductive tray (article) 300 made of metal or carbon in a manner shown in FIGS. 17A and 17B. An electrical length from a farthest end of the tray 300 based on the attachment position (an end in an open state farthest from the attachment position) to the input/output terminal 180h indicates a value of about $\lambda/2$ or more. If the clip-shaped RFID tag 100 is attached to a predetermined position of the tray 300, an electrical length from the farthest end of the tray 300 based on the predetermined position to the input/output terminal 180h indicates an integer multiple of about $\lambda/2$.

When a radio-frequency signal is transmitted from the RFIC element 180, the current I' originated from the current I flowing through the loop conductor 220 flows through the crocodile clip 120 and the tray 300. In this case, a maximum current point (a point of maximized current density) is formed at a position in the vicinity of the both ends 22001, 22002 of the loop conductor 220, and a maximum voltage point is formed at a position in the vicinity of the center of the loop conductor 220 (a position farthest from the RFIC element 180). Therefore, the loop conductor 220 defines and functions as an exciter or an exciting loop, and the crocodile clip 120 and the tray 300 define and function as radiators or radiation elements.

Additionally, since the second end 14202 of the connection conductor 142 is connected to the maximum current point of the loop conductor 220, the current I' flowing through the crocodile clip 120 and the tray 300 is also maximized. As a result, the gain of the communication signal is significantly improved. In other words, an improvement is made in radio-frequency transmission performance or communication characteristics.

Since the electrical length from the input/output terminal 180h to the tip of the clip piece 122 is adjusted to a value less than about $\lambda/2$, the gain of the communication signal is significantly reduced when the clip-shaped RFID tag 100 is removed from the tray 300. Therefore, a communication operation is able to be substantially turned on/off by attaching/detaching the clip-shaped RFID tag 100 to/from the tray 300.

In the third preferred embodiment, the clip-shaped RFID tag 100 is assumed to be attached to the conductive tray 300. However, a binder notebook 400 shown in FIG. 18 may be prepared as the article, and the clip-shaped RFID tag 100 may be attached to a helical metal fitting (conductor) 400m disposed on the binder notebook 400. In this case, the length of the helix defining the metal fitting 400m is adjusted to a length corresponding to an electrical length of about $\lambda/2$ or more. Therefore, when the clip-shaped RFID tag 100 is attached to the metal fitting 400m, the metal fitting 400m defines and functions as a radiator or a radiating element.

Figure 18:
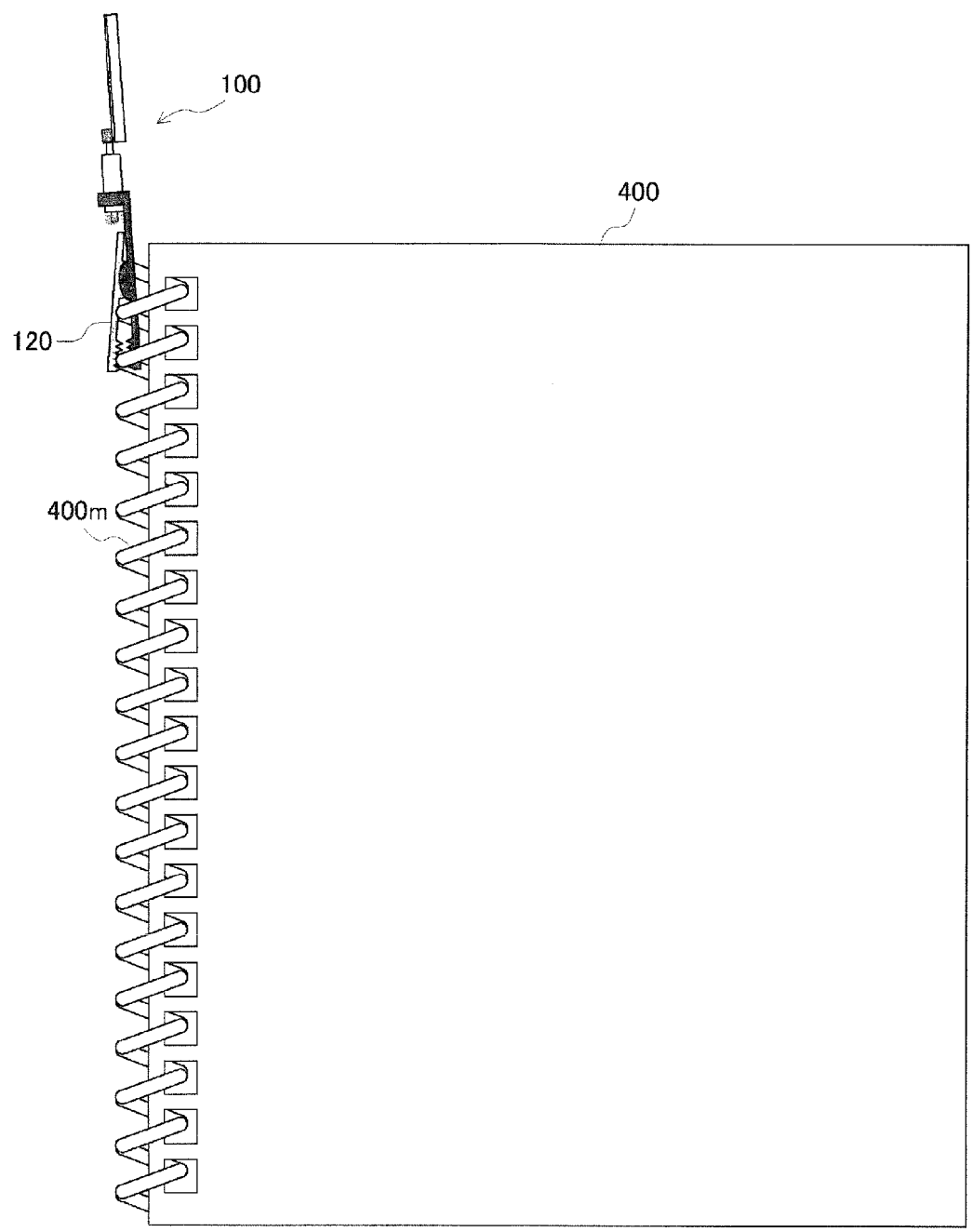
FIG. 18 is a front view of the clip-shaped RFID tag of the third preferred embodiment of the present invention and a binder notebook to which the clip-shaped RFID tag is attached viewed from the front.

Although the metal fitting 400m is assumed to be formed into a helical shape in FIG. 18, a plurality of metal fittings each defining a ring may be used instead of the helical metal fitting 400m. In this case, the rings must be adjusted in size such that an electrical length from a farthest end of the rings to the input/output terminal 180h becomes equal to or greater than about λ/2, for example.

Figure 19:
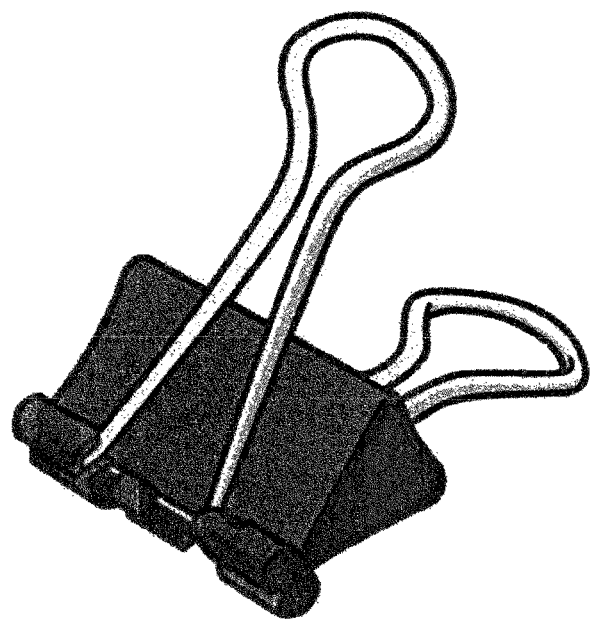
FIG. 19 is a perspective view of a binder clip when viewed obliquely.
Figure 20:
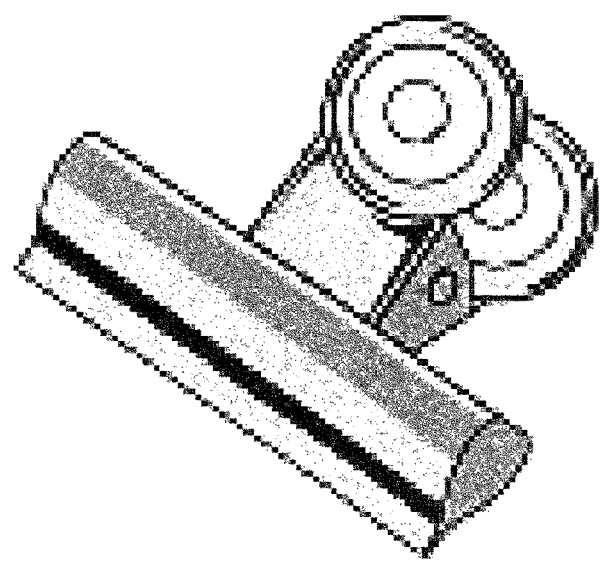
FIG. 20 is a perspective view of a bulldog clip when viewed obliquely.

Although the crocodile clip 120 is preferably used as the clip in the third preferred embodiment, a conductive binder clip or bulldog clip may be used instead (see FIGS. 19 and 20).

In the third preferred embodiment, the locking portions 121t and 122t of the crocodile clip 120 are directly connected to the conductor of the article. However, a non-slip member such as conductive rubber or insulating rubber may be attached to each of the locking portions 121t and 122t. Attachment of the non-slip members reduces the risk of the crocodile clip 120 easily dropping off from the article. If insulating rubber is used as the non-slip member, a capacitance is generated between the locking portion 121t or 122t and the article.

Although the power feeding circuit 180j shown in FIG. 16 is disposed on the power feeding circuit board 180c in the third preferred embodiment, the power feeding circuit 18j may not be included. In the third preferred embodiment, the RFIC element 180 has the structure in which the RFIC chip 180e is sealed by the sealing layer 180d so as to enhance the robustness. However, an RFIC bare chip may be configured as the RFIC element 180.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless IC device comprising:
    an object including a metal body;
    a loop conductor including a first loop end and a second loop end;
    an RFIC element including a first terminal electrode and a second terminal electrode respectively connected to the first loop end and the second loop end; and
    a connection conductor including a first end and a second end respectively connected to the loop conductor and the object; wherein
    the first end is connected to the loop conductor in a vicinity of the first loop end.

2. The wireless IC device according to claim 1, wherein a loop surface of the loop conductor extends along a surface of the object.

3. The wireless IC device according to claim 1, wherein
    the RFIC element includes an RFIC chip including a first input/output terminal and a second input/output terminal respectively connected to the first terminal electrode and the second terminal electrode;
    an electrical length between the first input/output terminal and the second input/output terminal is about ½ of a wavelength of a communication signal; and
    an electrical length from a farthest end of the metal body based on the second end to the first input/output terminal is equal to or greater than about ½ of a wavelength of the communication signal.

4. The wireless IC device according to claim 3, wherein
    the metal body includes a first edge different from a second edge corresponding to the farthest end of the metal body; and
    the second end is connected at the first edge to the object.

5. The wireless IC device according to claim 3, wherein
    the RFIC element further includes a power feeding circuit located between the loop conductor and the RFIC chip; and
    the first terminal electrode and the second terminal electrode are connected through the power feeding circuit to the first input/output terminal and the second input/output terminal.

6. The wireless IC device according to claim 1, further comprising an insulator on the surface of the object; wherein
    the second end is connected through the insulator to the object.

7. The wireless IC device according to claim 1, wherein the loop conductor, the RFIC element, and the connection conductor are disposed on an upper surface of the metal body.

8. The wireless IC device according to claim 1, wherein a length from the first loop end to the second loop end of the loop conductor is A, the connection conductor is connected to the loop conductor within a range of length from the first loop end up to approximately A/4.

9. The wireless IC device according to claim 1, wherein a length from the first loop end to the second loop end of the loop conductor is A, the connection conductor is connected to the loop conductor within a range of length from the first loop end up to approximately A/8.

10. The wireless IC device according to claim 1, wherein the RFIC element includes an RFIC chip and a power feeding circuit board.

11. The wireless IC device according to claim 10, further comprising a sealing layer that seals the RFIC chip to the power feeding circuit board.

12. The wireless IC device according to claim 1, wherein the loop conductor defines an antenna conductor that includes a leg portion and a fixing portion.

13. A clip-shaped RFID tag attachable to and detachable from a conductor of an article, the clip-shaped RFID tag comprising:
    a conductive clip attachable to the conductor;
    a loop conductor including a first loop end and a second loop end;
    an RFIC element including a first terminal electrode and a second terminal electrode respectively connected to the first loop end and the second loop end; and
    a connection conductor including a first end connected to the clip and a second end connected to the loop conductor in a vicinity of the first loop end.

14. The clip-shaped RFID tag according to claim 13, wherein the first end of the connection conductor is connected to the clip at a position opposite to a point of action of the clip relative to a fulcrum of the clip.

15. The clip-shaped RFID tag according to claim 13, wherein
    the RFIC element includes an RFIC chip including a first input/output terminal and a second input/output terminal respectively connected to the first terminal electrode and the second terminal electrode;
    an electrical length between the first input/output terminal and the second input/output terminal is about ½ of a wavelength of a communication signal; and
    an electrical length from a tip of the clip to the first input/output terminal is less than about ½ of a wavelength of the communication signal.

16. The clip-shaped RFID tag according to claim 13, wherein the conductive clip is a crocodile clip.

17. An article including an RFID tag comprising:
an article including a conductor; and
a clip-shaped RFID tag attachable to and detachable from the conductor, the clip-shaped RFID tag including:
 a conductive clip attached to the conductor;
 a loop conductor including a first loop end and a second loop end;
 an RFIC element including a first terminal electrode and a second terminal electrode respectively connected to the first loop end and the second loop end; and
 a connection conductor including a first end connected to the clip and a second end connected to the loop conductor in a vicinity of the first loop end.

18. The article according to claim 17, wherein the article is one of a conductive tray and a binder notebook.

* * * * *